United States Patent [19]
Bunczek

[11] Patent Number: 5,945,143
[45] Date of Patent: *Aug. 31, 1999

[54] CHEWING GUM AND GUM BASES HAVING REDUCED ADHESION TO ENVIRONMENTAL SURFACES

[75] Inventor: Michael T. Bunczek, Lisle, Ill.

[73] Assignee: the Wm. Wrigley Jr. Company, Chicago, Ill.

[ * ] Notice: This patent is subject to a terminal disclaimer.

[21] Appl. No.: 08/998,132

[22] Filed: Dec. 23, 1997

[51] Int. Cl.⁶ .................................................. A23G 3/30
[52] U.S. Cl. .................................................. 426/3; 426/6
[58] Field of Search .......................... 426/3, 6, 5

[56] References Cited

U.S. PATENT DOCUMENTS

| | | |
|---|---|---|
| 2,525,072 | 10/1950 | Kearby . |
| 2,761,782 | 9/1956 | Leonard . |
| 4,525,363 | 6/1985 | D'Amelia et al. ............................ 426/3 |
| 4,891,209 | 1/1990 | Heim ........................................... 426/3 |
| 5,380,530 | 1/1995 | Hill ........................................... 424/440 |
| 5,433,960 | 7/1995 | Meyers ........................................ 426/5 |
| 5,580,590 | 12/1996 | Hartman ....................................... 426/3 |
| 5,645,853 | 7/1997 | Winston et al. ............................ 426/3 |

FOREIGN PATENT DOCUMENTS

| | | |
|---|---|---|
| 88-7747 | 1/1988 | Japan . |
| 96-131082 | 5/1996 | Japan . |

*Primary Examiner*—Arthur L. Corbin
*Attorney, Agent, or Firm*—Hill & Simpson

[57] ABSTRACT

A gum base including an alkyl substituted polydimethylsiloxane. Chewing gums made from the gum base as well as methods for manufacturing chewing gum and gum bases are disclosed.

23 Claims, No Drawings

CHEWING GUM AND GUM BASES HAVING REDUCED ADHESION TO ENVIRONMENTAL SURFACES

BACKGROUND OF THE INVENTION

The present invention relates generally to chewing gum compositions and methods of making same. More specifically, the present invention relates to gum bases that create a chewing gum that has a reduced adhesion to environmental surfaces.

For hundreds of years, gum like substances have been chewed. In the late 1800's the predecessor to today's chewing gum compositions were developed. Chewing gum is enjoyed daily by millions of people worldwide.

Chewed gum cuds can be disposed of in a number of substrates by wrapping the substrate around the chewed gum. In fact, chewed gum is easily disposed of in the wrapper that initially houses the chewing gum.

But, chewed gum cuds when carelessly discarded, can adhere to environmental surfaces. Such surfaces include concrete, brick, wood, carpets, and fabrics. This is due to the fact that chewing gum, due to its formulation, typically has an adhesive-like characteristic after it is chewed. Therefore, a chewed gum cud can stick to surfaces on which it is placed or onto which it is discarded. Chewed gum cuds that adhere to environmental surfaces can be an unsightly nuisance. Such gum cuds can be difficult, time consuming, and expensive to remove.

There is therefore a need for chewing gum that will not adhere, or will have a reduced adherence, to environmental surfaces such as concrete, brick, wood, carpet and fabrics.

SUMMARY OF THE INVENTION

The present invention provides gum base, and chewing gum made from the gum base, that has reduced adhesion. These gum bases are less adhesive, creating chewed gum cuds that are easier to remove than conventional chewed gum cuds, but retain desirable chewing characteristics.

To this end, in an embodiment, the present invention provides a gum base comprising an elastomer, a softener, a filler, a resin, and an alkyl substituted polydimethylsiloxane.

In an embodiment, the alkyl substituted polydimethylsiloxane is substituted with an alkyl group having at least six carbons.

In an embodiment, the alkyl substituted polydimethylsiloxane is a dimethyl-methyloctadecylsiloxane copolymer.

In an embodiment, the alkyl substituted polydimethylsiloxane comprises approximately 0.1% to about 25% of the base by weight.

In an embodiment, the alkyl substituted polydimethylsiloxane comprises approximately 1% to about 10% of the base by weight.

In an embodiment, the alkyl substituted polydimethylsiloxane has an average molecular weight of approximately 1,000 to about 100,000.

In another embodiment of the present invention, a chewing gum is provided comprising a water soluble gum portion and a water insoluble base portion that includes an alkyl substituted polydimethylsiloxane.

Still further, the present invention provides a method for producing chewing gum base comprising the steps of providing an alkyl substituted polydimethylsiloxane and adding the alkyl substituted polydimethylsiloxane to an elastomer, softener, resin, and filler to produce a gum base.

In an embodiment, the method includes the steps of providing the alkyl substituted polydimethylsiloxane by substituting at least some methyl groups in a polydimethylsiloxane with a side group chosen from the group consisting of alkanes and alkenes having at least six carbons.

In an embodiment of the method, the method includes the step of substituting for at least 5% of the methyl groups.

In an embodiment, the alkyl substituted polydimethylsiloxane is a dimethyl-methyloctadecylsiloxane copolymer.

In an embodiment, the alkyl substituted polydimethylsiloxane comprises approximately 0.1% to about 25% of the base by weight.

In an embodiment, the alkyl substituted polydimethylsiloxane has an average molecular weight of approximately 1,000 to about 100,000.

An advantage of the present invention is that it provides chewing gum compositions that have reduced adhesive characteristics while retaining desirable chewing gum texture.

Another advantage of the present invention is that it provides a gum base that provides chewing gums that produce chewed gum cuds having reduced adhesiveness to environmental surfaces.

Still, an advantage of the present invention is to provide a chewing gum composition that after being chewed can easily be removed from physical surfaces.

Moreover, another advantage of the present invention is to provide a chewing gum composition that even if improperly discarded, will not create environmental concerns.

Additional features and advantages of the present invention are described in, and will be apparent from, the Detailed Description of the Presently Preferred Embodiments.

DETAILED DESCRIPTION OF THE PRESENTLY PREFERRED EMBODIMENTS

The present invention provides improved chewing gum compositions, gum bases for making chewing gum compositions, and methods for making same. Pursuant to the present invention, gum bases are provided that create chewing gums that produce gum cuds having less adhesive characteristics. Thus, the resultant chewing gum cuds are easier to remove than conventional chewed gum cuds. Thus, the gum base reduces adhesion of improperly discarded gum cuds to environmental surfaces such as wood, concrete, fabric, carpet, metal, and other sources. But, the chewing gums retain their desirable chewing characteristics. Pursuant to the present invention, the gum base includes alkyl substituted polydimethylsiloxane.

Polysiloxanes are polymers that include alternating silicon and oxygen atoms in the polymeric backbone. Typically, each silicon atom carries two alkyl side groups. Most commonly, these side groups are methyl groups. In such cases these polymers are known as polydimethylsiloxane. More commonly these polymers are known as silicones.

It has been found that by substituting higher alkyl groups, for example a $C_{18}$ group, in the polydimethylsiloxane that increased compatibility with gum base components can be achieved. For example, the following substitution can be provided:

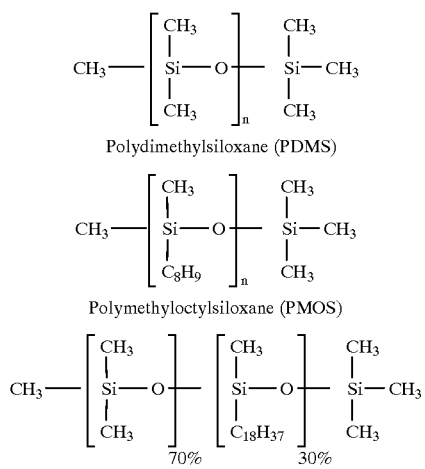

(70%) Dimethyl-(30%) Methyloctadecylsiloxane Copolymer (DMMODS)

The selection and frequency of substituted side groups is an important aspect of the present invention; by substituted side groups, it is meant higher alkyl groups which are substituted for methyl groups in polydimethylsiloxane. If the substituted side groups are too long or too frequent, the adhesion of the gum cud may not be reduced. If the substituted side groups are too short or too infrequent, poor compatibility with the gum base may result.

In general, linear alkane groups of six to 30 carbons are preferred with 12 to 24 carbons being most preferred. However, it is specifically contemplated that the linear alkenes, branched alkanes and alkenes and even cyclic alkyl groups may be employed.

The optimal frequency of substitution is dependent upon the size of the substituted alkyl group. For the most preferred size groups (e.g., $C_{12}$ to $C_{24}$) substitution rates of 5 to 50% and preferably 10 to 20% should be used. For smaller alkyl groups such as $C_6$ or $C_8$, substitutions of up to 100% may be desirable to achieve optimum compatibility and adhesion reduction. Generally, when the substitution rate is 50% or less, only one substitution at most will be made on each silicon atom.

The average molecular weight of the siloxane polymer may be an important consideration. If the molecular weight is too high, incompatibility with other base components may result. If the average molecular weight is too low, toxicity concerns may arise with respect to the smallest chains in the mixture. Generally, polysiloxanes having an average molecular weight in the range of 1,000 to 100,000 are preferred with average molecular weights of 1,000 to 10,000 being most preferred.

Usage levels of the alkyl substituted polydimethylsiloxane in the base will be dependent on a number of factors including the precise polysiloxane used, the overall base composition and the desired characteristics of the final product. Levels between 0.1% and 25% may be useful with 1 to 10% being preferred and 3 to 8% being most preferred. It may be necessary to adjust levels of other base components such as plasticizer and elastomer levels to compensate for any change in texture caused by the polysiloxane. Such formulation adjustments are within the skill of the ordinary base formulator.

As noted, the alkyl substituted polydimethylsiloxane may be added to typical gum base formulas. Additionally, the ingredients of the chewing gum formulations may be modified to provide desirable characteristics. Typical chewing gum bases include: elastomers; elastomer plasticizers; fillers; softeners; waxes; anti-oxidants; colorants; flavors; and bulk sweeteners; high intensity sweeteners; flavoring agents; softeners; emulsifiers; colors; acidulants; fillers; and other components that provide desired attributes.

Chewing gum generally consists of a water insoluble gum base, a water soluble portion, and flavors. The water soluble portion dissipates with a portion of the flavor over a period of time during chewing. The gum base portion is retained in the mouth throughout the chew. The insoluble gum base generally comprises elastomers, resins, fats and oils, softeners, and inorganic fillers.

Elastomers provide the rubbery, cohesive nature to the gum which varies depending on this ingredient's chemical structure and how it is blended with other ingredients. Elastomers suitable for use in gum base may include natural rubber such as smoked or liquid latex and guayule, natural gums such as jelutong, lechi caspi perillo, massaranduba, balata, massaranduba chocolate, nispero, rosidinha, chicle, gutta percha, gutta kataiu, niger gutta, tunu, chilte, chiquibul, gutta hang kang, synthetic rubber such as butadiene-styrene copolymers, polyisobutylene, isobutylene-iso-prene copolymers, polybutadiene, vinyl polymers such as polyvinyl acetate, polyethylene, vinyl copolymers such as vinyl acetate/vinyl laurate, ethylene/vinyl acetate, polyvinyl alcohol or mixtures thereof.

Elastomer plasticizers vary the firmness of the gum base. Their polymer plasticizing strength and their varying softening points cause varying degrees of finished gum firmness when used in gum base. This is an important consideration when one wants to use flavors that differ in plasticizing strength of the gum base in finished gum.

Elastomer plasticizers suitable for use in gum base include natural rosin esters such as glycerol ester of partially hydrogenated rosin, glycerol ester of polymerized rosin, glycerol ester of partially dimerized rosin, glycerol ester of rose, glycerol ester of tall cil rosin, pentaerythritol esters of partially hydrogenated rose, partially hydrogenated methyl esters of rosin, pentaerythritol ester of rosin, synthetic elastomer plasticizers such as terpene resins derived from alpha-pinene, beta-pinene and/or d-limonene and mixtures thereof.

Fillers modify the texture of the base and aid in processing. Fillers suitable for use in the gum base include carbonate types such as magnesium and calcium carbonate, ground limestone, gypsum and silicate types such as magnesium and aluminum silicate, clay, alumina, talc, as well as titanium oxide, mono-, di- and tricalcium phosphate, cellulose polymers such as ethyl, methyl and wood or mixtures thereof.

Softeners modify the texture and cause the hydrophobic and hydrophilic components of the base/chewing gum to be miscible. Softeners suitable for use in the inventive gum base include hydrogenated vegetable oil, non-hydrogenated vegetable oil, lard, hydrogenated tallow, cocoa butter, glycerol monostearate, glycerol triacetate, lecithin, mono-, di and triglycerides, acetylated mono-, di and triglycerides, distilled mono-, di or triglycerides, fatty acids such as stearic, palmitic, oleic, linoleic and linolenic or mixtures thereof.

Waxes aid in the curing of the finished gum made from the gum base as well as improve the release of flavor, shelf-life and texture. Waxes suitable for the present invention include synthetic waxes such as polyethylene and Fischer-Tropsch waxes, natural waxes such as candelilla, carnauba, beeswax, rice bran, petroleum waxes such as microcrystalline and paraffin and mixtures thereof.

Antioxidants prolong shelf-life and storage of gum base, finished gum or their respective components including fats and flavor oils. Antioxidants suitable for use in gum base include butylated hydroxyanisole (BHA), butylated hydroxytoluene (BHT), beta-carotenes, tocopherols, Vitamin C, propyl gallate, other synthetic and natural types or mixtures thereof.

Colorants impart desired color characteristics or remove undesired color by whitening of the base. Colorants suitable for use in gum base include FD&C type lakes, plant extracts, fruit and vegetable extracts, titanium dioxide or mixtures thereof.

Gum bases are typically prepared by adding an amount of the elastomer, elastomer solvent and filler to a heated sigma blade mixer with a front to rear speed ratio of typically 2:1. The initial amounts of ingredients is determined by the working capacity of the mixing kettle in order to attain a proper consistency. After the initial ingredients have massed homogeneously, the balance of the elastomer solvent, filler, softeners, etc. are added in a sequential manner until a completely homogeneous molten mass is attained. This can usually be achieved in one to three hours, depending on the formulation. The final mass temperature can be between 70° C. and 130° C. and preferably between 100° C. and 120° C. The completed molten mass is emptied from the mixing kettle into coated or lined pans, extruded or cast into any desirable shape and allowed to cool and solidify.

In addition to a water insoluble gum base portion, typical chewing gum compositions includes a water soluble bulk portion and one or more flavoring agents. The water soluble portion can include bulk, high intensity sweeteners, flavoring agents, softeners, emulsifiers, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5 to about 15% by weight of the chewing gum. The softeners may include glycerin, lecithin, and combinations thereof. Aqueous sweetener solutions such as those containing sorbitol, hydrogenated starch hydrolysates, starch hydrolysates and combinations thereof, may also be used as softeners and binding agents in chewing gum.

Bulk sweeteners include both sugar and sugarless components. Bulk sweetener typically constitutes 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, glalactose, corn syrup solids, and the like, alone or in combination.

Sorbitol can be used as a sugarless sweetener. Additional sugarless sweeteners can include, but are not limited to, other sugar alcohols such as mannitol, sylitol, hydrogenated starch hydrolysates, maltitol, and the like, alone or in combination.

High intensity artificial sweeteners can also be used in combination with the above. Preferred sweeteners include, but are not limited to, sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low calorie bulking agent can be used. Examples of low caloric bulking agents include: polydextrose; oligofructose; frutooligosaccharide; palatinose oligosaccharide; natural carbohydrate gum hydrolysate; or indigestible dextrins. However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

By way of example, and not limitation, examples of the following invention will be given:

EXAMPLE 1

A conventional gum base having the following formulation was prepared:

|  | % |
|---|---|
| Paraffin Wax | 13.3 |
| Polyisobutylene | 1.6 |
| Butyl Rubber | 10.1 |
| Polyvinylacetate | 27.3 |
| Terpene Resin | 26.8 |
| Lecithin | 2.7 |
| Glycerol Monostearate | 4.8 |
| Hydrogenated Vegetable Oil | 2.0 |
| Calcium Carbonate | 10.8 |
| BHT | 0.1 |
| Color | 0.5 |
|  | 100.00 |

EXAMPLE 2

An embodiment of the present invention was prepared using (70%) dimethyl-(30%) methyloctadecylsiloxane copolymer (7/30 DMMODS) available from United Chemical Technologies, 2731 Bartram Road, Bristol, Pa. 19007 (USA) Catalog No. PS 130.5. This polymer is believed to be a random copolymer with average molecular weight of about 2000. An embodiment of the inventive base was prepared according to the following formula:

|  | % |
| --- | --- |
| Gum Base of Example 1 | 95.0 |
| 70/30 DMMODS | 5.0 |
|  | 100.00 |

Chewing gums were prepared according to the following formula:

|  | Ex.3 (Comparative) | Ex. 4 (Inventive) |
| --- | --- | --- |
| Gum Base of Example 1 | 20.7% | — |
| Gum Base of Example 2 | — | 20.7% |
| Sugar | 54.1 | 54.1 |
| Corn Syrup | 13.2 | 13.2 |
| Dextrose Monohydrate | 10.2 | 10.2 |
| Glycerin | 1.2 | 1.2 |
| Spearmint Flavor | 0.6 | 0.6 |
|  | 100.0 | 100.0 |

A second sample of the Example 2 base and the Example 4 gum was also prepared.

The chewing gum of Examples 3 and 4 were tested for adhesion to concrete according to the following method:

Gum pieces were soaked in water overnight then kneaded for one minute to remove water soluble components. The cuds were then applied to concrete blocks using 200 pounds of pressure for five seconds.

In a screening test, the concrete was heated to 105° F. for four hours and cooled overnight. A high-pressure spray washer using cold tap water and 1000 psi pressure was used to remove the cud. The time to remove and the quantity of residue remaining were noted.

In an extreme test, the concrete block was heated to 120° F. for three days, cooled overnight and washed with the washer at 1500 psi until the bulk of the cud was dislodged. Spraying was continued for a total of 60 seconds or until the surface was completely clean, whichever happened first. The time to remove the cud and time to completely clean, or the quantity of residue remaining after 60 seconds, were noted.

Results (average, n=3) were as follows:

|  | Screening Test | | Extreme Test | |
| --- | --- | --- | --- | --- |
|  | Time(s)* | Residue | Time(s)* | Residue |
| Ex. 3 (comparative) | 6.0 | Medium | 11.5 | Very High |
| Ex. 4 (inventive) (Sample 1) | 3.3 | Very Low | 3.0 | Low |
| Ex. 4 (inventive) (Sample 2) | 2.7 | Medium | 8.3 | Medium-high |

*Seconds

As can be seen, the inventive gum exhibited much less adhesion than the prior art comparative gum.

Informal sensory evaluations of the two gums indicated that the inventive product (Example 4) was desirably softer in the intermediate and final chew and had slightly better flavor release and character throughout the chew compared to the comparative gum (Example 3).

Additional gum bases were prepared using polymethyloctylsiloxane (PMOS) from United Chemical Technologies (Catalog No. PS240-KG). This material is believed to have an average molecular weight of 2000.

|  | Ex. 5 | Ex. 6 | Ex. 7 |
| --- | --- | --- | --- |
| Gum Base of Ex. 1 | 98% | 95% | 90% |
| PMOS | 2 | 5 | 10 |
|  | 100% | 100% | 100% |

Chewing gums were prepared according to Example 3 except substituting the bases of Examples 5, 6 and 7. These gums are Examples 8, 9 and 10 respectively. These gums were tested for adhesion to concrete using the previously described method with the following results (average, n=3):

|  | Screening Test | | Extreme Test | |
| --- | --- | --- | --- | --- |
|  | Time(s)* | Residue | Time(s)* | Residue |
| Ex. 1 (comparative) | 6.0 | Medium | 11.5 | Very High |
| Ex. 8 (2% PMOS in base) | 4.3 | Low |  | Not Tested |
| Ex.9 (5% PMOS in base) | 4.0 | High |  | Not Tested |
| Ex. 10 (10% PMOS in base) | 4.3 | Low | 10.0 | Very Low |

*Seconds

These results demonstrate a reduction in adherence for the PMOS-containing bases.

EXAMPLE 11

A gum base was prepared according to the following formula:

|  | % |
| --- | --- |
| Gum Base of Example 1 | 90.0 |
| 70/30 DMMODS | 10.0 |
|  | 100.00 |

A batch of chewing gum is made according to Example 3 except the Example 11 base was used. This chewing gum was designated Example 12. In addition, a larger batch of the Example 4 gum was made and both gums along with Example 3 (comparative example) were tested repeatedly for adhesion to generate statistically useful data.

The results for n=15 were:

|  | Time Ave.(s)* | S.D. | Residue |
| --- | --- | --- | --- |
| Screening Test (n-15) | | | |
| Example 3 (Control) | 4.5 | 0.52 | Med. |
| Example 3 (Control-retest) | 4.5 | 0.40 | Med. |
| Example 4 (5% 70/30 DMMODS) | 2.1 | 0.28 | Med-Low |
| Example 12 (10% 70/30 DMMODS) | 1.9 | 0.26 | Very-Low |
| Extreme Test | | | |
| Example 3 (Control) | 7.5 | 0.64 | Med-High |
| Example 3 (Control-retest) | 6.1 | 0.23 | Med-High |

-continued

| | Time Ave.(s)* | S.D. | Residue |
|---|---|---|---|
| Example 4 (5% 70/30 DMMODS) | 4.3 | 0.59 | Med-Low |
| Example 12 (10% 70/30 DMMODS) | 2.7 | 0.49 | Low |

*Seconds

Statistical analysis demonstrates that the inventive compositions are less adhesive than the comparative example at a 99% confidence level.

It should be understood that various changes and modifications to the Presently Preferred Embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A gum base comprising:
   an elastomer;
   a softener;
   a filler;
   a resin; and
   an alkyl substituted polydimethylsiloxane.

2. The gum base of claim 1 wherein the alkyl substituted polydimethylsiloxane is substituted with an alkyl group having at least six carbons.

3. The gum base of claim 1 wherein the alkyl substituted polydimethylsiloxane is a dimethyl-methyloctadecylsiloxane copolymer.

4. The gum base of claim 1 wherein the alkyl substituted polymethylsiloxane is polymethyloctylsiloxane.

5. The gum base of claim 1 wherein the alkyl substituted polydimethylsiloxane comprises approximately 0.1% to about 25% of the base by weight.

6. The gum base of claim 1 wherein the alkyl substituted polydimethylsiloxane comprises approximately 1% to about 10% of the base by weight.

7. The gum base of claim 1 wherein the alkyl substituted polydimethylsiloxane has an average molecular weight of approximately 1,000 to 100,000.

8. The gum base of claim 1 including an emulsifier, color, and antioxidant.

9. A chewing gum comprising:
   a water soluble gum portion; and
   a water insoluble base portion including an alkyl substituted polydimethylsiloxane.

10. The chewing gum of claim 9 wherein the alkyl substituted polydimethylsiloxane is substituted with an alkyl group having at least six carbons.

11. The chewing gum of claim 9 wherein the alkyl substituted polydimethylsiloxane is a dimethyl-methyloctadecylsiloxane copolymer.

12. The chewing gum of claim 9 wherein the alkyl substituted polydimethylsiloxane is polymethyloctylsiloxane.

13. The chewing gum of claim 9 wherein the alkyl substituted polydimethylsiloxane has an average molecular weight of approximately 1,000 to about 100,000.

14. The chewing gum of claim 9 wherein the alkyl substituted polydimethylsiloxane comprises approximately 1% to about 10% by weight of the water insoluble base portion.

15. The chewing gum of claim 9 wherein the water insoluble base portion includes an elastomer, a softener, a filler, a resin, an emulsifier, a color, and an antioxidant.

16. The chewing gum of claim 9 wherein the water soluble portion includes a flavor and a sweetener.

17. A method for producing gum base comprising the steps of:
   providing an alkyl substituted polydimethylsiloxane; and
   adding the alkyl substituted polydimethylsiloxane to an elastomer, softener, resin, and filler to produce a gum base.

18. A method of claim 17 including the step of providing the alkyl substituted polydimethylsiloxane by substituting at least some methyl groups in a polydimethylsiloxane with a side group chosen from the group consisting of alkanes and alkenes having at least six carbons.

19. The method of claim 18 including the step of substituting for at least 5% of the methyl groups.

20. The method of claim 17 wherein the alkyl substituted polydimethylsiloxane is a dimethyl-methyloctadecylsiloxane copolymer.

21. The method of claim 17 wherein the alkyl substituted polydimethylsiloxane comprises approximately 0.1% to about 25% of the base by weight.

22. The method of claim 17 wherein the alkyl substituted polydimethylsiloxane has an average molecular weight of approximately 1,000 to about 100,000.

23. The method of claim 17 wherein the alkyl substituted polydimethylsiloxane is polymethyloctylsiloxane.

* * * * *